Sept. 15, 1953     R. R. CONE     2,652,203
QUILLER RAKE

Filed Oct. 11, 1951

INVENTOR:
RICHARD R. CONE.

BY *Eaton + Bell*

ATTORNEYS.

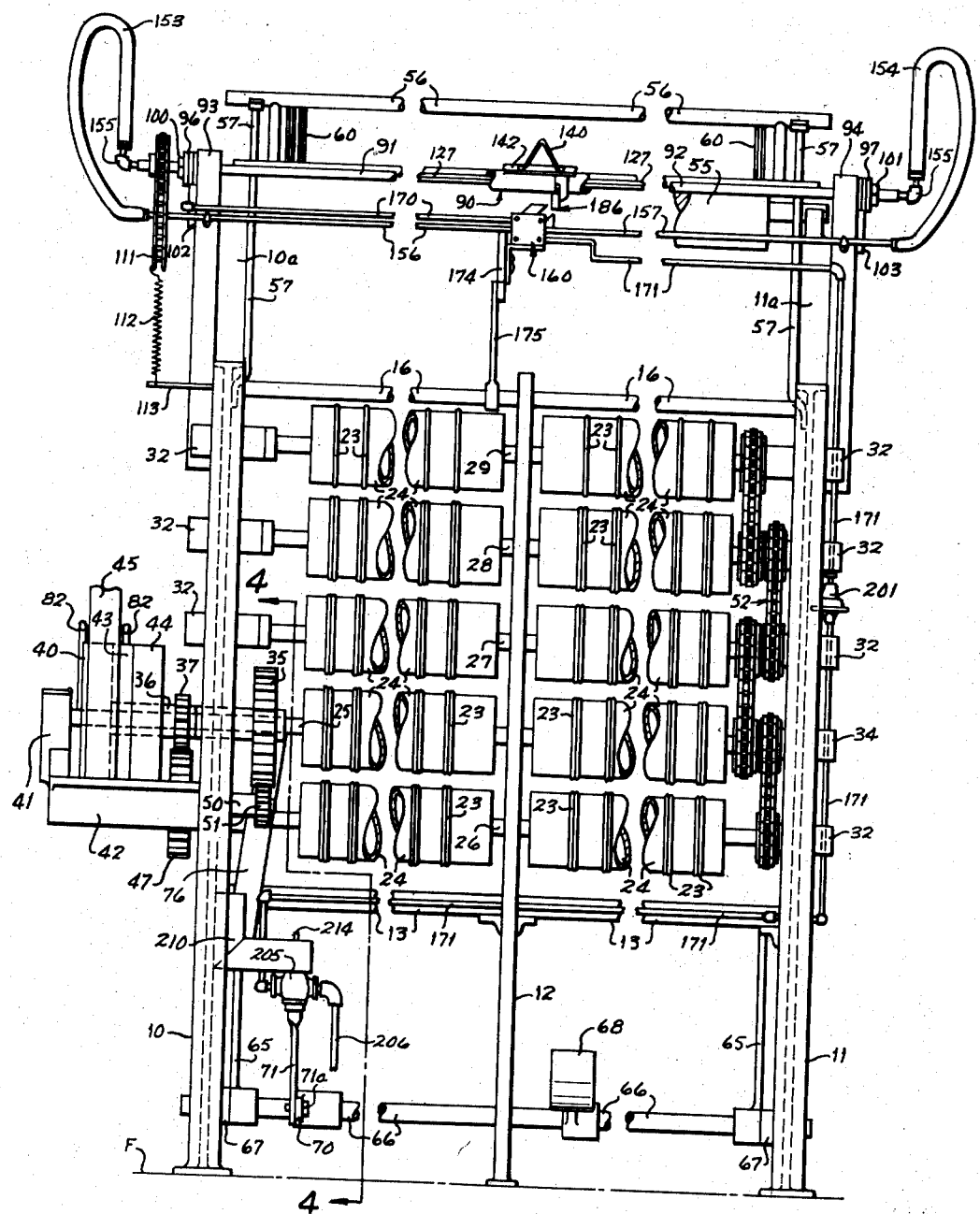

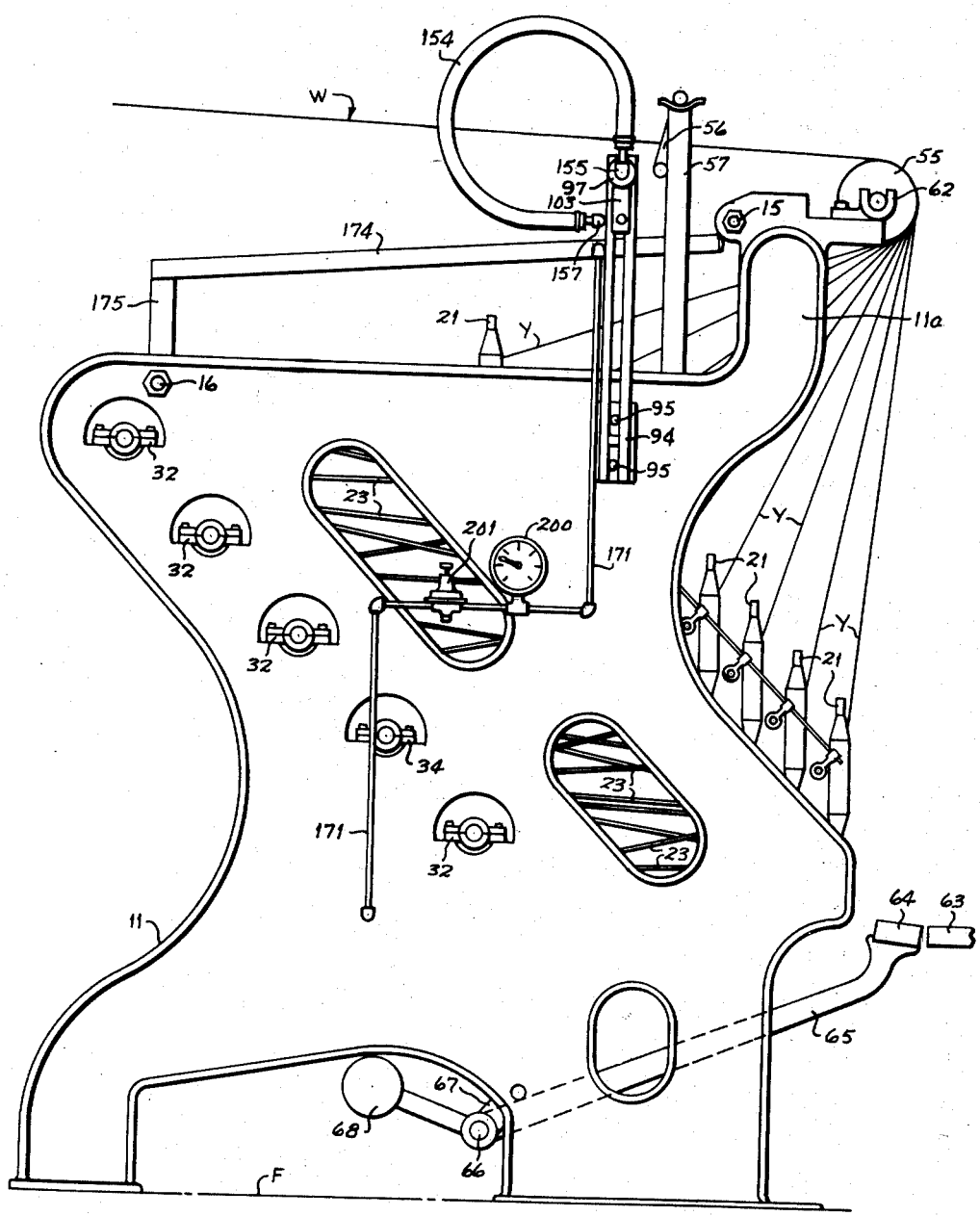

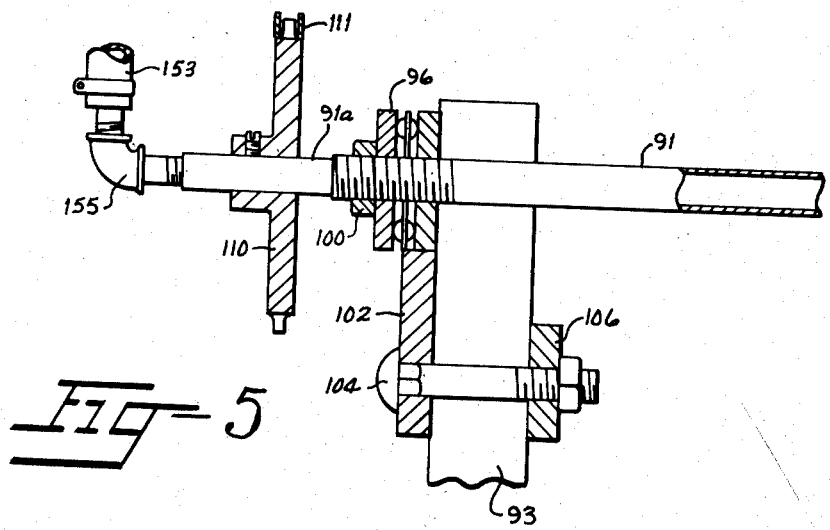
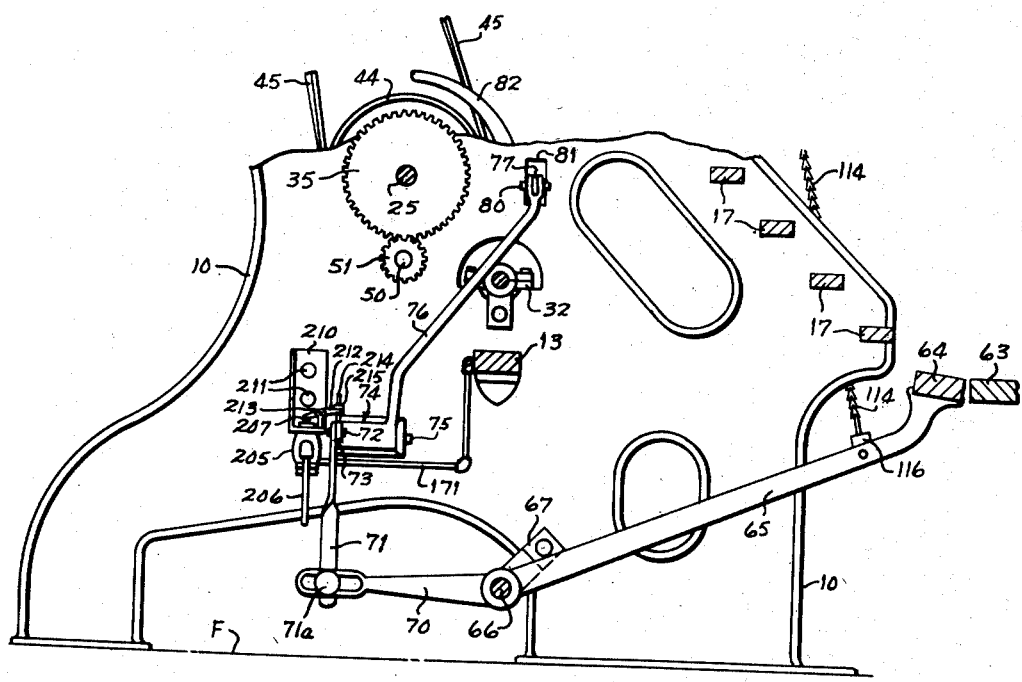

Sept. 15, 1953
R. R. CONE
QUILLER RAKE
2,652,203
Filed Oct. 11, 1951
9 Sheets-Sheet 5
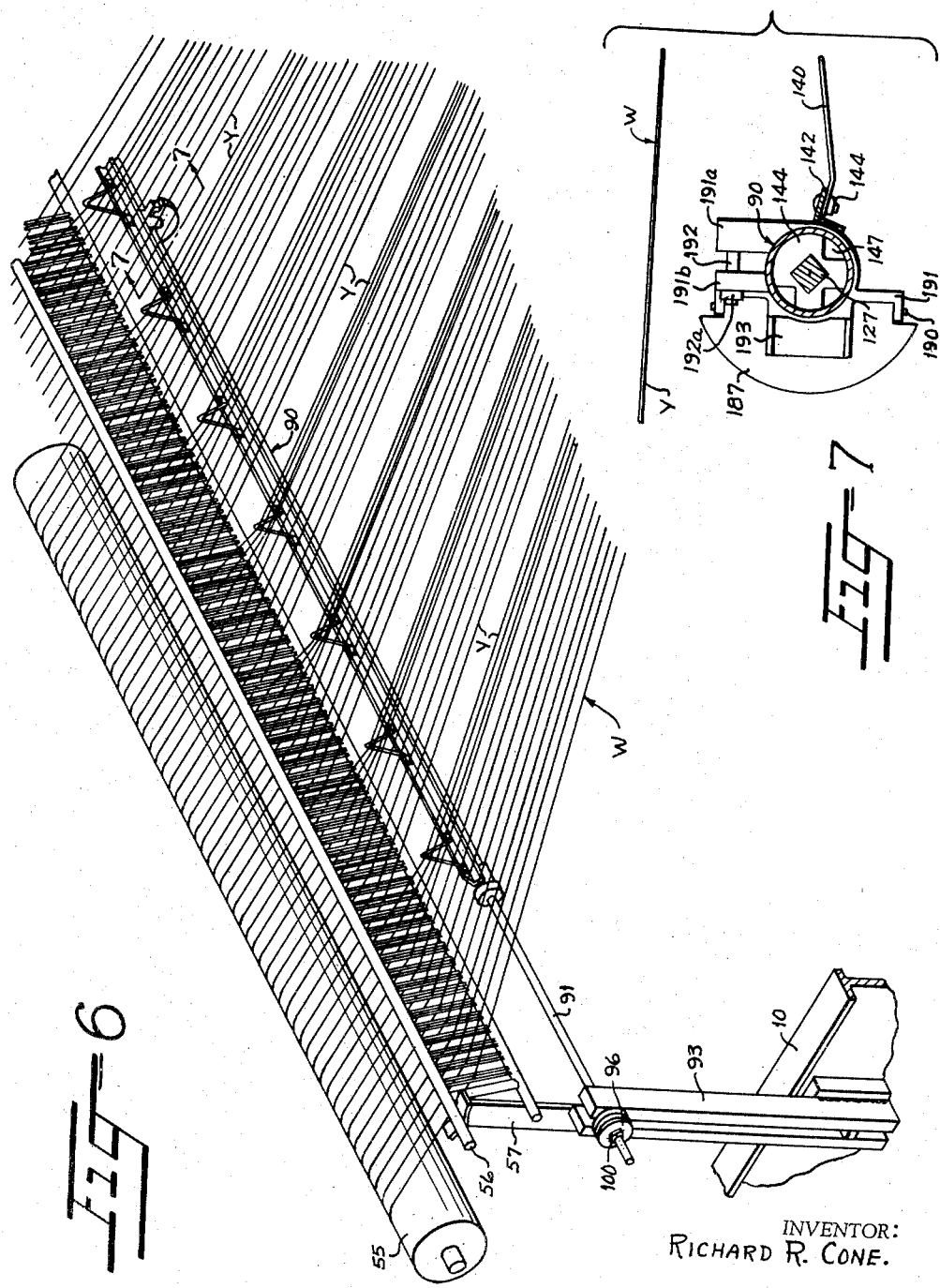
INVENTOR:
RICHARD R. CONE.
BY
Eaton & Bell
ATTORNEYS.

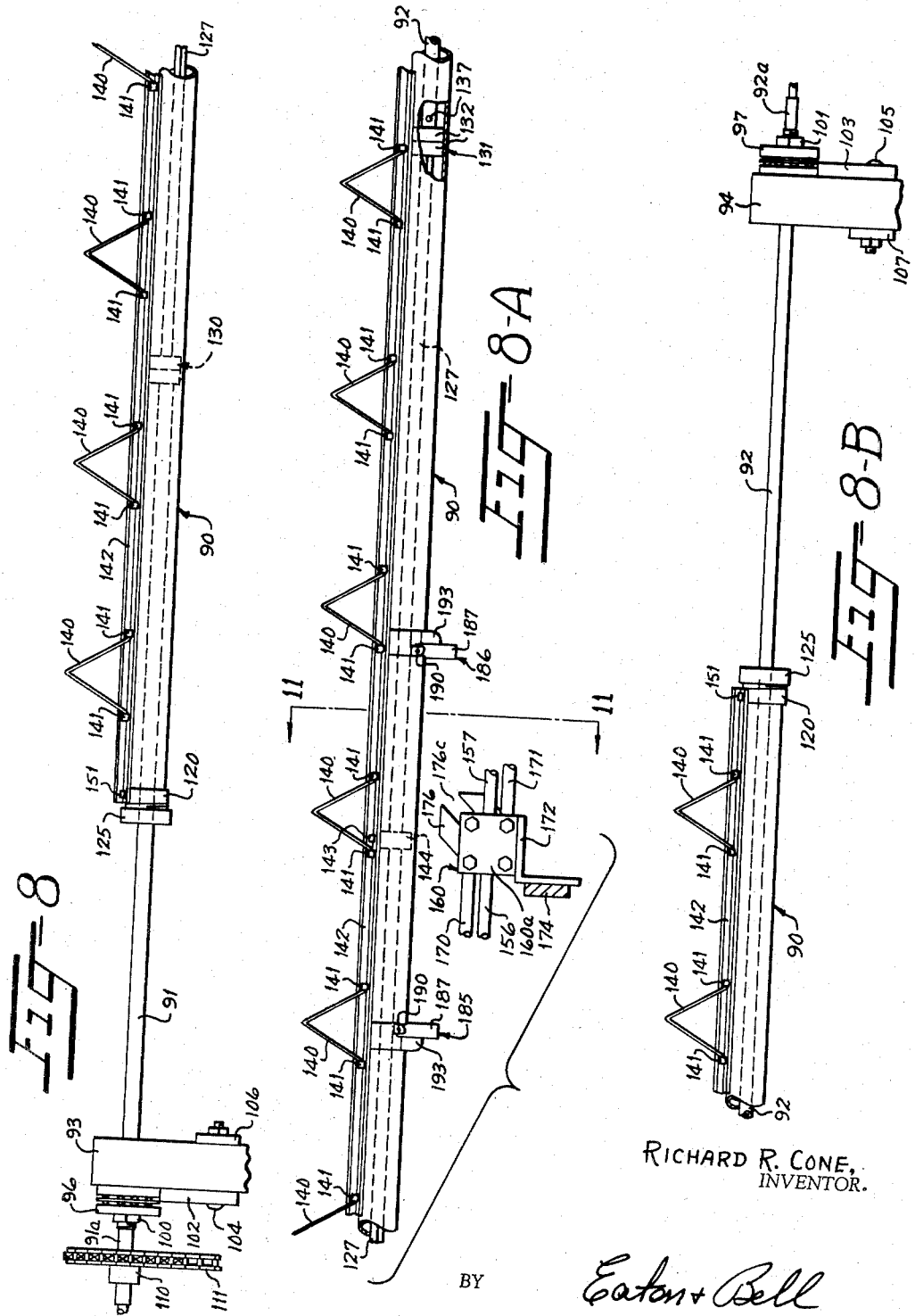

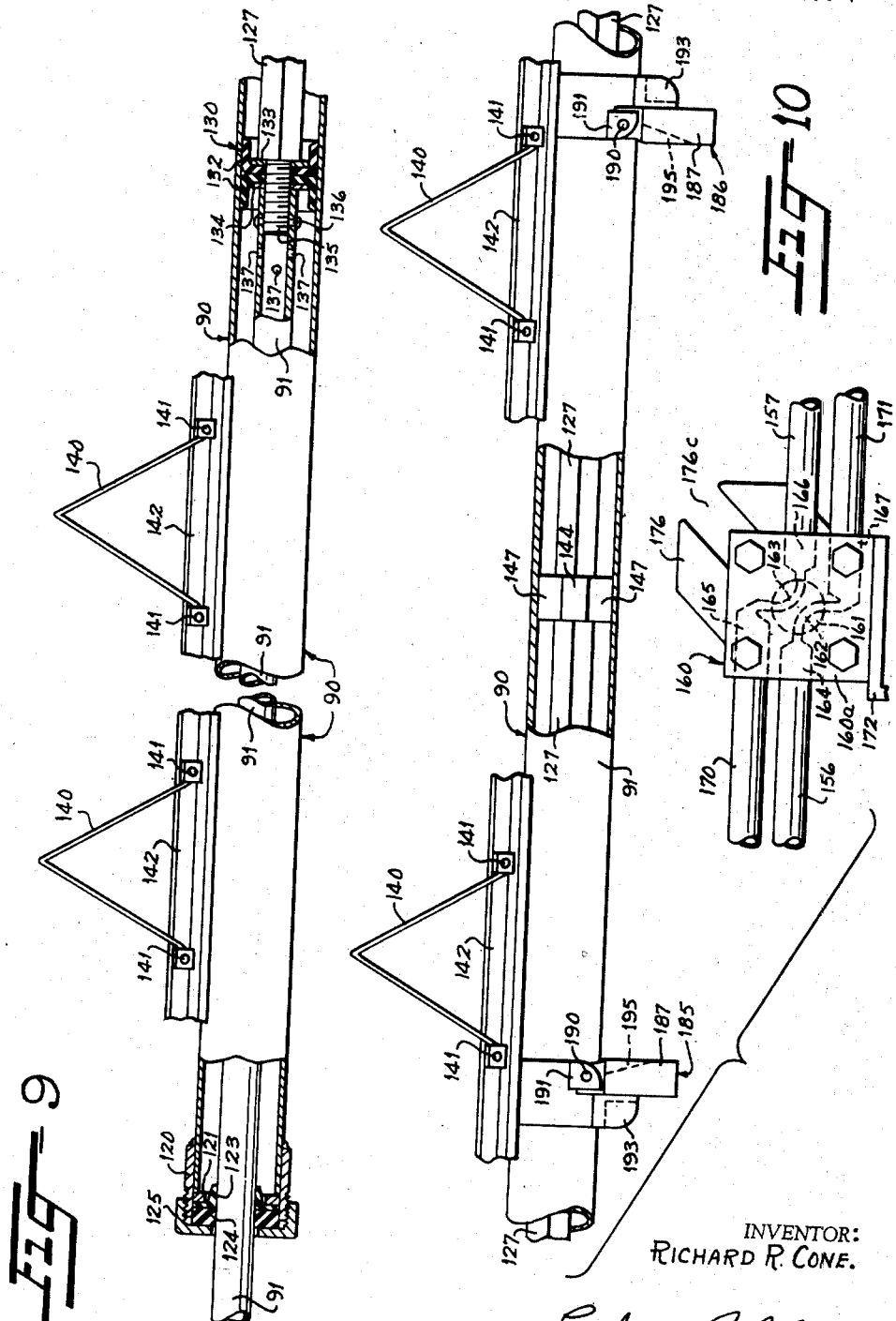

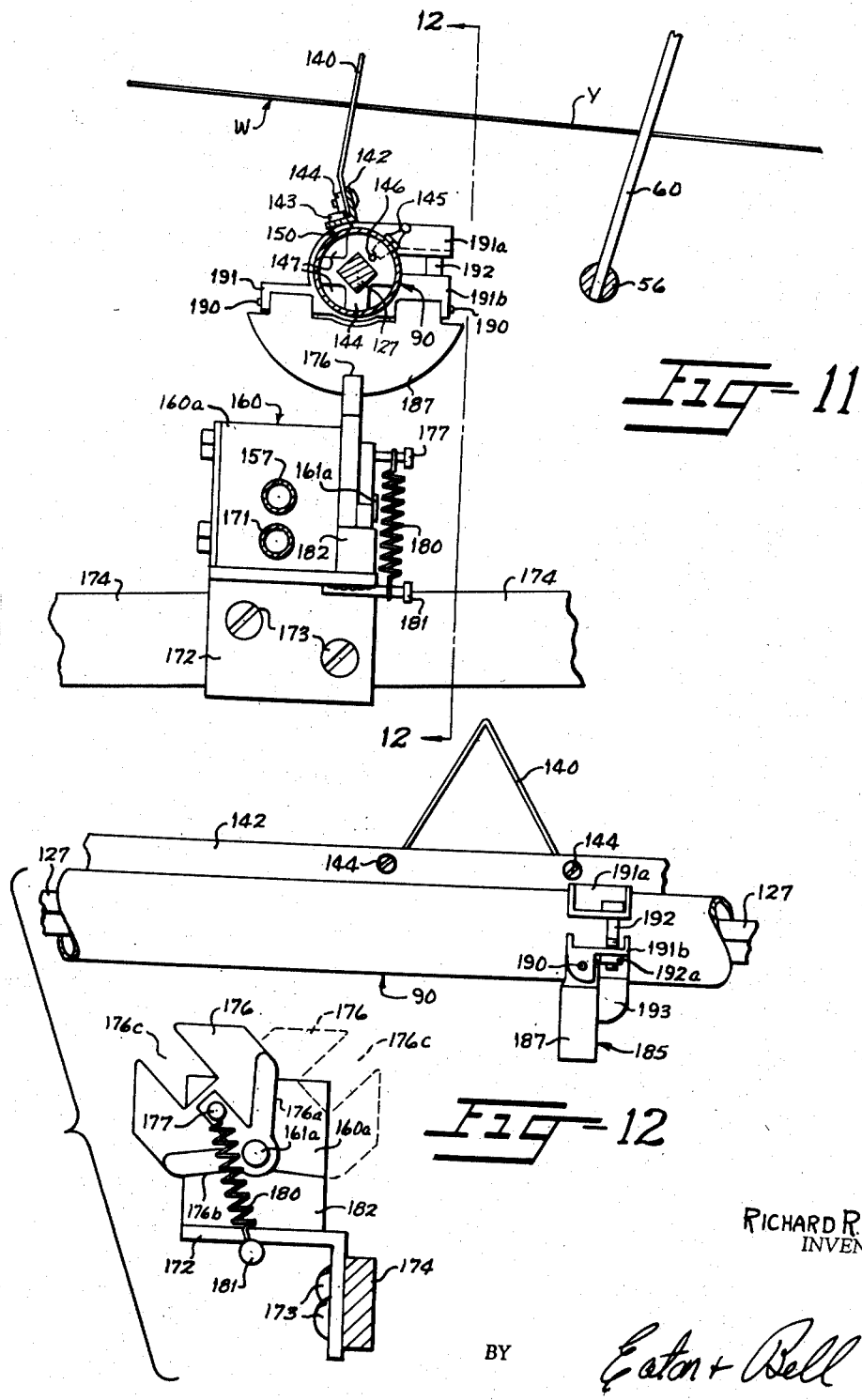

Sept. 15, 1953
R. R. CONE
2,652,203
QUILLER RAKE
Filed Oct. 11, 1951
9 Sheets-Sheet 9
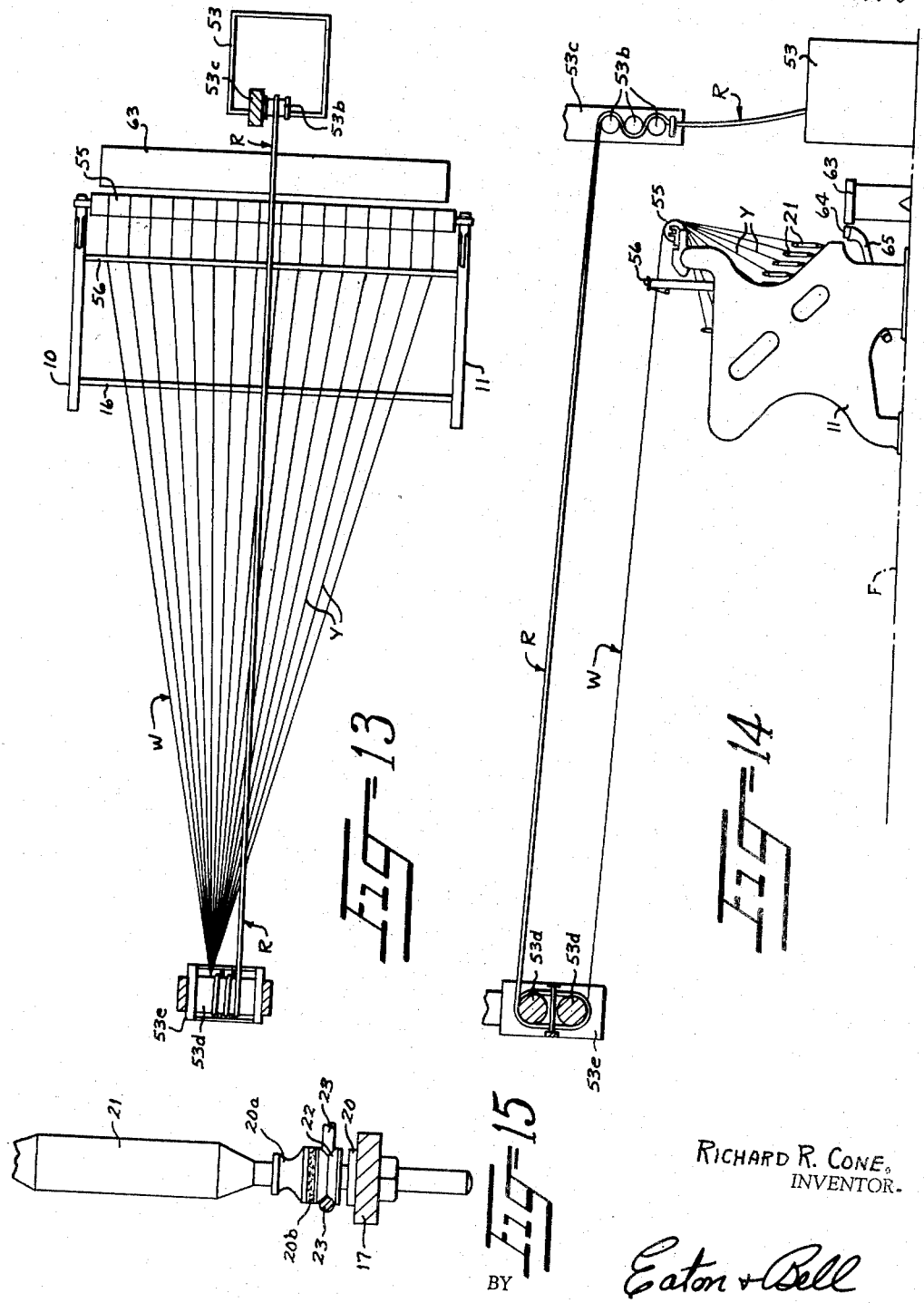
RICHARD R. CONE,
INVENTOR.
BY Eaton + Bell
ATTORNEYS.

Patented Sept. 15, 1953

2,652,203

UNITED STATES PATENT OFFICE 2,652,203

QUILLER RAKE

Richard R. Cone, Gastonia, N. C., assignor to Threads Incorporated, Gastonia, N. C., a corporation of North Carolina Application October 11, 1951, Serial No. 250,928

17 Claims. (Cl. 242—35.5)

This invention relates to apparatus for separating adherent yarns such as may occur in a sheet of warp and, more especially, this invention relates to an improved automatic rake for separating adherent yarns as they are processed on a quilling machine or the like.

Heretofore, many attempts have been made to perfect a suitable apparatus for raking or strumming a sheet of parallel yarns such as a sheet of warp yarns, for separating the individual yarns from each other in advance of the sheet passing through the usual reed in its course to the quills on the spindles of a quilling machine or to a warp on a long chain beamer. However, there have been many disadvantages in the raking devices heretofore employed such as, for example, some quilling machines have been provided with a reciprocating member having fingers thereon for raking the warp yarns for separating the same and including a mechanical driving means for the reciprocating member of a type which was necessarily noisy due to intermeshing pinions and other moving elements.

Associated with most quilling machines is a turntable or container which is disposed adjacent the usual platform on which the operator stands during operation of the quilling machine. The yarn usually passes upwardly from the container in the form of a rope of untwisted parallel yarns, and then passes above the operator and the quilling machine and rearwardly to a tailstock including a pair of parallel idler cylinders about which the rope of yarns passes several times. The yarns then would fan outwardly in warp form to the usual reed of the quilling machine to be wound about the quills on the spindles of the machine. The quills are usually frictionally supported by the driven spindles thus enabling an operator to grasp the rope of yarns to retard its movement which, of course, would cause the quills to rotate at a slower speed than the spindles on which they are mounted.

Heretofore, at least one form of quill raking mechanism has been driven by means of a mechanical connection with the cylinders of the tailstock with the result that, upon the operator grasping the rope of yarns for retarding movement thereof, the raking device would operate at a relatively slow speed thus rendering the same inefficient in its operation. In other words, another disadvantage of some types of raking devices heretofore in use is that the raking means has been driven either in a reciprocatory or rotary manner at a speed proportionate to the speed at which the warp yarns were taken up by the quills after they had passed through the usual reed. Thus, upon an unfavorable condition of the yarn, such as, upon a plurality of adherent or intertwisted yarns approaching the reed, the operator would either stop the machine or, by grasping the rope of yarns, would allow the warp yarns to pass through the reed at a relatively slow rate so they would not break. It is evident that, if the raking means was driven proportionately to the speed at which the yarns passed through the reed, then the raking means would slow down as the speed of the warp yarns was slowed down thereby decreasing the effectiveness of the raking means when it would be most important that the raking means should operate at its normal speed.

It is, therefore, the primary object of this invention to overcome such defects, as well as many other defects apparent to those familiar with the art, by providing an improved raking device for quilling machines which is so designed as to be positioned immediately beneath the sheet of warp yarns at a point in advance of the usual reed and including a member having a plurality of closely spaced radially extending fingers thereon, wherein an improved means is provided for driving the member having the fingers thereon in a reciprocatory manner excluding any intermeshing mechanical driving devices, such as pinions and the like, and the driving means being operated independently of the means for taking up the yarn, such as the frictionally driven quills, but which driving means, on the other hand, is rendered operable automatically to stop and start simultaneously with the stopping and starting of the machine.

It is another object of this invention to provide an improved raking device for quilling machines which may be economically constructed and maintained, which is also efficiently effective in separating adherent yarns and is simple to operate.

It is still another object of this invention to provide an improved raking device for quilling machines comprising an elongated tubular member or cylinder having a pair of longitudinally spaced pistons therein and opposite ends of the cylinder being closed. The pistons are fixed to the proximate ends of rigid stationary conduits or tubular piston rods which extend outwardly substantially from the corresponding pistons and are fixed on the frame of the machine. The outer ends of the tubular piston rods have means for alternately directing fluid under pressure, such as compressed air, to one of the same while exhausting compressed air from the other of the same whereby the compressed air will alternately be introduced to opposite end portions of the cylinder and will thereby cause the cylinder to reciprocate, the means for admitting compressed air to the rigid conduits being controlled by manually operable means which starts and stops the machine.

It is still another object of this invention to provide an improved raking device of the character last described with means for automatically rotating the elongated tubular member or cylinder having the fingers thereon in one direction for a partial revolution each time the machine is stopped and for also automatically rotating the piston a partial revolution in the opposite direction each time the machine is started whereby the fingers on the piston may be so positioned as to move with the piston out of engagement with the warp yarns as the machine is stopped or operated at a relatively slow speed, thereby facilitating the piecing together of broken ends or otherwise permitting the operator to manipulate the warp yarns without being encumbered by the raking fingers and, whereby, upon starting the machine and operating the same at its normal high speed, the fingers will again automatically move into position for engaging the warp yarns as longitudinal reciprocatory movement is imparted to the cylinder to thereby effectively separate adherent yarns.

Of course, it is evident that the machine may be started and operated at a relatively slow speed and subsequently stopped without the raking fingers having moved into engagement with the warp yarns and, as a matter of fact, the spindles and the corresponding quills may be operated at an intermediate high speed wherein the fingers would be disposed closely adjacent the warp yarns but would not be in engagement therewith, the purpose of which will be later described.

Some of the objects of the invention having been stated, other objects will appear as the description proceeds when taken in connection with the accompanying drawings, in which—

Figure 2 is a rear elevation of the quilling machine looking at the right-hand side of Figure 1 with parts broken away and showing many of the parts schematically with many other parts being omitted for purposes of clarity;

Figure 3 is a left-hand side elevation of the quilling machine with the improved raking device mounted thereon and looking at the right-hand side of Figure 2;

Figure 4 is a fragmentary elevation with parts in section looking substantially along the line 4—4 in Figure 2 and illustrating a particular means for controlling operation of the improved raking device;

Figure 5 is an enlarged fragmentary vertical sectional view taken substantially along the line 5—5 in Figure 1 and showing the manner in which one end of the improved raking device is mounted;

Figure 6 is an isometric view of a portion of the improved raking device showing parts of the quilling machine associated therewith schematically and looking substantially in the direction of the arrow 6 in Figure 1;

Figure 7 is an enlarged fragmentary vertical sectional view taken substantially along the line 7—7 in Figure 6 but showing the cylinder and the corresponding fingers thereon in a horizontal or inoperative position rather than a vertical or operative position;

Figure 8 is an enlarged fragmentary elevation of the portion of the improved raking device shown in the upper left-hand portion of Figure 2 but omitting the sheet of yarns, the reed and other parts with the exception of the means for supporting the corresponding end of the improved raking device;

Figure 1:
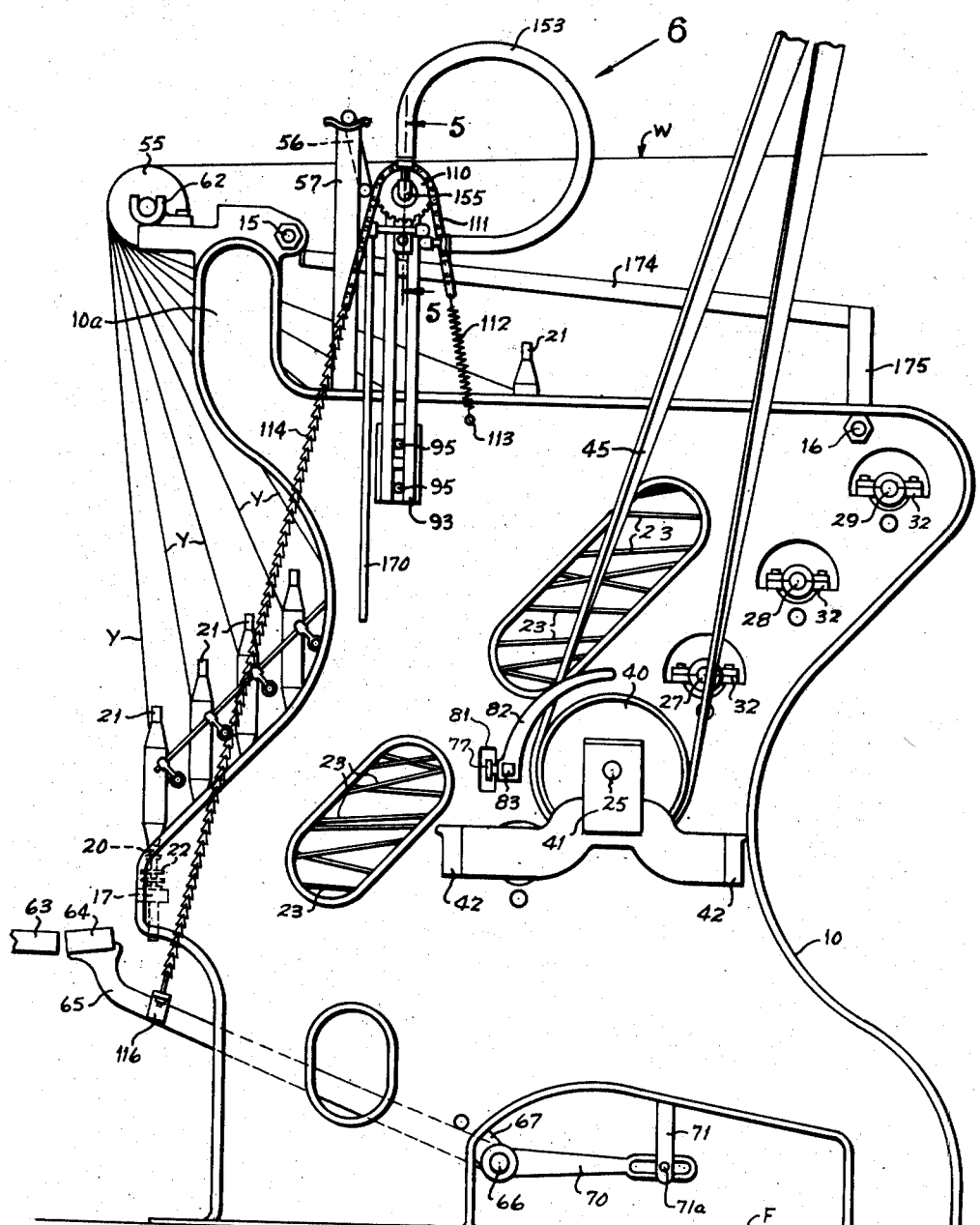
Figure 1 is a right-hand side elevation of a typical quilling machine showing the improved raking device mounted thereon.

Figure 8-A is a fragmentary elevation of a medial portion of the improved raking device and is an extension to the right-hand end of the portion of the device shown in Figure 8;

Figure 8-B is a fragmentary elevation of a portion of the opposite end of the device from that shown in Figure 8 and being an extension to the right-hand end of the portion of the device shown in Figure 8-A;

Figure 9 is an enlarged fragmentary elevation of the central portion of Figure 8 with parts broken away illustrating the particular manner in which the rigid conduit or piston rod and its piston are mounted within one end of the tubular member or cylinder;

Figure 10 is an enlarged elevation of the central portion of Figure 8-A showing the valve control means in detail and also illustrating a means for keying the cylinder relative to the piston rods at opposed ends thereof;

Figure 11 is an enlarged fragmentary elevation with parts in section looking substantially along the line 11—11 in Figure 8-A and also showing a portion of the reed and the sheet of warp yarns in association therewith;

Figure 12 is a fragmentary elevation with parts in section looking substantially along the line 12—12 in Figure 11 and showing the valve mechanism and the corresponding control means therefor but omitting the sheet of warp yarns;

Figure 13 is a schematic top plan view of a quiller showing the usual course of the rope of yarns and the manner in which the yarns fan outwardly in their course to the reed, the present raking apparatus being omitted to avoid confusion;

Figure 14 is a schematic side elevation of the quiller as shown in Figure 13;

Figure 15 is a fragmentary elevation of one of the spindles, with a quill thereon, showing the spindle rail in cross section.

Referring more specifically to the drawings, the improved rake or yarn separating means is shown mounted on a conventional quiller or quilling machine of usual construction. Considering the manner in which the improved raking device cooperates with the driving means of the quilling machine, a description of the quilling machine will first be given.

Referring to Figures 1, 2 and 3, it will be observed that the quilling machine comprises laterally spaced first and second side frame members 10 and 11 between which a vertically disposed intermediate frame member 12 is disposed, these frame members 10, 11 and 12 resting upon a floor F. The vertically disposed frame members 10, 11 and 12 are bridged by suitable horizontal frame members including a frame member 13 which is suitably secured to the proximate surfaces of the frame members 10 and 11 and is also secured to the intermediate frame member 12.

The frame members 10, 11 and 12 are also secured in proper spaced relation to each other by upper frame members or tie rods 15 and 16. The vertically disposed frame members 10, 11 and 12 are also spanned by a plurality of angularly spaced horizontally disposed bolster or spindle rails 17 which are disposed at the front of the machine, or the left-hand side of Figure 1, and each of which has a plurality of longitudinally spaced spindles 20 mounted for rotation thereon. Each of the spindles 20 has a suitable quill 21 positioned thereon to each of which an individual strand of yarn Y is directed in a manner to be presently described. These spindles 20 are of usual construction and each has a suitable whorl 22 thereon which is engaged by a corresponding endless tape or endless rope 23 for transmitting rotation thereto.

It is to be noted, in Figure 15, that the lower end of each quill rests upon a sleeve 20a rotatable relative to the spindle 20 and a friction or clutch ring 20b encircles the spindle 20 and is frictionally engaged by the proximate surfaces of the whorl 22 and the sleeve 20a whereby the quill 21 may rotate at a slower speed than the spindle 20 and whorl 22. This may happen upon one of the yarns Y becoming unduly taut or all the yarns being slowed by the operator.

The endless tapes or ropes 23 extend rearwardly and partially encircle corresponding cylinders 24 which are fixedly mounted on shafts 25 to 29, inclusive, there being two of the cylinders 24 mounted on each of the shafts 25 to 29 as is clearly shown in Figure 2. The remote ends of the shafts 26 to 29, inclusive, are rotatably mounted in suitable bearings 32 suitably secured to the corresponding side frame members 10 and 11. The medial portions of the shafts 26 to 29 extend through the intermediate frame member 12. The specific structure of the cylinders 24 and the corresponding shafts 25 to 29, inclusive, is a matter of choice and a detailed description thereof is deemed unnecessary.

The shaft 25 is the main driving shaft of the machine and is journaled at one end thereof in a bearing block 34 which is suitably secured to the side frame member 11, the other end thereof penetrating a relatively large gear 35 which is suitably secured to the shaft 25 (Figure 2). This end of the shaft 25 also slidably penetrates a hub portion 36 of a pinion 37 and has a main driving or high speed pulley 40 fixedly mounted adjacent the outer end thereof. The outer end of the shaft 25 relative to the frame member 10 is rotatably mounted in a bearing block 41.

The bearing block 41 is fixed on the outer end of a substantially U-shaped bracket 42 which extends outwardly from the corresponding frame member 10. The hub 36 of the gear 37 has a relatively narrow low speed pulley 43 fixedly mounted thereon, the diameter of which is substantially the same as the high speed pulley 40. This hub 36 also has an idler pulley 44 rotatably mounted thereon and which is engaged by a belt 45 when the machine is at rest.

During normal operation of the machine, the belt 45, which is driven by any suitable means disposed above the machine and which has been omitted from the drawings, is positioned in engagement with the main driving or high speed pulley 40 substantially as shown in Figure 2. During periods of relatively slow operation of the machine, the belt 45 is shifted into engagement with the low speed pulley 43, by means to be presently described, whereupon the gear 37 will be driven by the pulley 43 to rotate about the shaft 25.

Now, the pinion 37 engages a relatively large gear 47 which is fixed on the stub shaft 50 mounted for rotation in the side frame member 10. This shaft 50 extends through the side frame member 10 and has a pinion 51 fixed thereon which meshes with the relatively large gear 35 heretofore described, whereby the pinion 37 will cause the relatively large gear 35 to rotate at a substantially slower rate than is the case when the belt 45 is in engagement with the high speed pulley 40. The pulley 40 being fixed on the shaft 25 causes the shaft 25 to rotate at a relatively high speed. The drive shaft 25 drives the shafts 26 to 29, inclusive, by means of sprocket wheel and sprocket chain combinations indicated generally at 52. It is thus seen that the quilling machine has conventional means for varying the speed of the spindles 20 and the quills 21 thereon.

It will be observed in Figures 1, 3 and 6 that the individual strands of yarn Y extend from an idler roll 55 to which the yarns Y are directed in the form of a sheet of warp yarns designated generally at W. As is well known to those familiar with the art, the sheet of warp yarns W usually originates in the form of a rope or chain of parallel untwisted yarns. Referring to Figures 13 and 14, the yarns, while in rope form are indicated generally at R. This rope of yarns R extends from a suitable container or turn table 53 disposed forwardly of the quilling machine and within reach of the operator thereof and from whence the rope of yarns R extends upwardly between a plurality of primary idler tension rolls 53b rotatably mounted on a suitable support 53c suitably suspended from above.

The rope R then extends over the machine and then rearwardly about secondary idler tension rolls or cylinders 53d of a tailstock 53c also suitably suspended from above. After the rope has passed about the rolls 53d a few times the yarns then extend forwardly and fan out to form the sheet of warp yarns W. The sheet of warp yarns W then passes through a reed 56 to the roll 55. The reed 56 is of conventional construction and is mounted upon brackets 57 which extend downwardly and are suitably secured to the inner or proximate surfaces of the side frame members 10 and 11 (Figure 2).

The reed is provided with a plurality of conventional vertical spacing pins 60 and, in their course from the source to the idler roll 55, individual yarns Y in the sheet of warp preferably pass between alternate spacing pins 60 to the idler roll 55 to thus separate the strands of yarn Y in advance of their being directed to the quills 21. The idler roll 55 is supported for rotation in suitable bearing blocks 62 which are suitably secured to upwardly projecting portions 10a and 11a of the respective side frame members 10 and 11.

As is well known to those familiar with the art, a quilling machine requires the constant attention of an operator and these machines are usually provided with a suitable platform 63, only a portion of which is shown schematically in Figures 1, 3 and 4, on which the operator stands during operation of the machine. The operation of the machine is controlled by means of a treadle bar 64 which is positioned closely adjacent the platform 63 and extends from adjacent the side frame member 10 to a point adjacent the side frame member 11.

This treadle bar is suitably secured to the front ends of a pair of operating levers 65 which extend rearwardly and downwardly and are fixedly mounted on a transverse shaft 66 which is oscillatably mounted in suitable bearing blocks 67 suitably secured to the proximate surfaces of the side frame members 10 and 11. The treadle bar 64 is normally urged upwardly to inoperative position by a weight member 68 eccentrically mounted on the shaft 66 (Figures 2 and 3). The shaft 66 also has one end of a crank arm 70 fixedly mounted thereon which extends rearwardly and to which the lower end of a link 71 is pivotally connected, as at 71a (Figures 1, 2 and 4).

The link 71 extends upwardly and is pivotally connected, as at 72, to a crank arm 73 which extends away from the observer in Figure 4 and is an integral part of a bell crank broadly designated at 74. This bell crank 74 is oscillatably mounted on a shaft 75 suitably secured to the side frame member 10. The bell crank 74 has an upwardly and forwardly extending angularly disposed arm 76 integral therewith to the upper end of which one end of a shipper arm 77 is pivotally connected as at 80.

The side frame member 10 has an opening 81 therethrough (Figures 1 and 4) which is loosely penetrated by the shifter arm 77 and the outer end of the shifter arm 77 is pivotally connected to a bifurcated belt shifter 82 which is mounted for lateral sliding movement on a guide bar 83 projecting outwardly from the side frame member 10. This belt shifter 82 curves upwardly and rearwardly and engages opposed sides of the belt 45.

It is thus seen that, upon the operator moving the treadle bar 64 downwardly, to substantially the position shown in Figures 1, 3 and 4, the belt shifter 82 assumes the position shown in Figures 1 and 2, thus causing the belt 45 to remain in engagement with the main or high speed driving pulley 40. On the other hand, upon the pressure of the operator's foot on the treadle bar 64 being relaxed, the treadle bar 64 moves upwardly by means of the weight member 68 (Figure 3) thereby causing the link 71 and the arm 73 of the bell crank 74 to move downwardly in Figure 4. This causes the upper end of the arm 76 of the bell crank 74 to move towards the observer in Figure 4 to thereby move the belt shifter 82 away from the observer in Figure 1 or from left to right in Figure 2 until the belt 45 is in engagement with the low speed pulley 43. This causes the spindles 20 to rotate at a relatively slow speed, and to thereby cause the sheet of warp yarns W to move from right to left at a relatively slower rate than is the case when the belt 45 is in engagement with the high speed or driving pulley 40.

It is evident that, upon the operator's foot being entirely removed from engagement with the upper surface of the treadle bar 64, the weight member 68 (Figures 2 and 3) will cause the belt shifter 82 to move the belt 45 into engagement with the idler pulley 44 to thereby stop the machine. The parts heretofore described are conventional parts of a quilling machine and it is with these parts that the improved raking device, to be presently described, is adapted to be associated.

Improved raking device

The improved raking device comprises an elongated tubular reciprocating member or cylinder, broadly designated at 90, which is disposed closely adjacent and in advance of the reed 56 and which is also only slightly shorter than the length of the reed 56 to thereby insure that the stroke of the cylinder 90 may be relatively short to properly traverse the fan-shaped arrangement of the yarns Y in the sheet of warp W.

Although the cylinder 90 is shown as being circular in cross-section, it is evident that the cylinder or reciprocating member may be of any desired configuration in cross-section. Opposed ends of the cylinder 90 are mounted for longitudinal sliding movement on tubular piston rods, pipes or conduits 91 and 92 which extend outwardly and loosely extend through the bifurcated upper ends of respective standards or bearing stands 93 and 94 which extend downwardly and are suitably secured to the remote or outer surfaces of the respective vertically disposed side frame members 10 and 11, as by screws 95 (Figures 1, 2 and 3).

The threaded outer ends of the piston rods 91 and 92 are rotatably mounted in suitable respective thrust bearings 96 and 97 which are shown in the form of anti-friction thrust bearings in Figure 5, 8 and 8-B. Means, to be presently described, are provided for tying the proximate ends of the piston rods 91 and 92 with respect to each other and, due to the combined lengths of the piston rods 91 and 92 and the cylinder 90 relative to the diameters thereof, it is necessary that the proximate ends of the piston rods 91 and 92 and the cylinder 90 be prevented from sagging to thereby insure that the entire length of the cylinder 90 shall be maintained at the proper elevation relative to the sheet of warp yarns W.

Therefore, the threaded outer ends of the piston rods 91 and 92 have respective nuts 100 and 101 threadably mounted thereon (Figures 8 and 8-B) which are tightened against the outer races of the respective thrust bearings 96 and 97 to thereby tighten the inner races of the thrust bearings 96 and 97 against the outer surfaces of the respective standards or bearing stands 93 and 94 and which will, in turn, place the piston rods 91 and 92 under tension, in the manner of a bow string, to thereby insure that the cylinder 90 and the piston rods 91 and 92 will be maintained in axial alinement with respect to each other.

The thrust bearings 96 and 97 are maintained and adjusted in the desired vertical position relative to the sheet of warp yarns W by means of respective adjusting blocks 102 and 103 (Figures 5, 8 and 8-B), on which the thrust bearings 96 and 97 rest, and which extend downwardly and are suitably secured to the outer surfaces of the respective standards or bearing stands 93 and 94 as by bolts 104 and 105. These bolts 104 and 105 loosely penetrate the bifurcated upper ends of the respective standards 93 and 94 and also penetrate respective anchor plates 106 and 107 to thereby secure the adjusting blocks 102 and 103 in the desired position.

Referring to Figures 1, 5 and 8, it will be observed that one end of the piston rod 91 has a reduced portion 91a integral therewith on which a sprocket wheel 110 is fixedly mounted. This sprocket wheel has a medial portion of a sprocket chain 111 passing thereover, in engagement therewith, one end of which extends downwardly and rearwardly and has the upper end of a tension spring 112 connected thereto. This tension spring 112 extends downwardly and the lower end thereof is connected, as at 113, to the side frame member 10.

The end of the sprocket chain 111, remote from the end to which the tension spring 112 is connected, has the upper end of a link 114 connected thereto which link is shown in the form of a link chain in Figure 1. It is evident that this link 114 may be supplemented by a cord, cable or rigid link if so desired. In fact, the link chain may be supplemented by extending the sprocket chain 111 downwardly to the point at which the lower end of the link chain 114 is connected.

The lower end of the link chain 114 is connected to one of the operating levers 65, as by an angle clip 116, thus causing the sprocket wheel 110 to rotate a partial revolution in a counterclockwise direction in Figure 1 when the treadle bar 64 is moved downwardly by the operator. It is evident that the sprocket wheel 110 will rotate in the opposite direction when the treadle bar 64 is released by the operator due to the tension spring 112. The purpose of this oscillatory movement of the sprocket wheel 110 will be later described.

The piston rods 91 and 92 slidably penetrate suitable closures or cylinder heads on respective ends of the cylinder 90. It will be observed in Figure 9 that each of the closures or cylinder heads comprises an externally threaded tubular member or collar 120 which is fixedly mounted on the corresponding end of the tubular member or cylinder 90, as by welding, and extends substantially beyond said corresponding end. An annular washer 121 engages the corresponding end of the tubular member or cylinder 90 and is disposed within the portion of the tubular member 120 which extends beyond the end of the cylinder 90.

There is also positioned within this member 120 an inwardly tapered sealing member 123, against the outer surface of which a resilient washer 124 is secured by a gland nut 125 which is threadably mounted on the outer end of the corresponding tubular member 120. The gland nut 125 is loosely penetrated by the corresponding piston rod 91 or 92 and the resilient washer 124 and the sealing member 123 at each end of the cylinder 90 are slidably penetrated by the corresponding piston rods 91 and 92.

The proximate ends of the piston rods are connected to opposed ends of a tie or splicing bar 127 which is shown as being polygonal in cross-section in Figure 11 but which may be of any desired configuration in cross-section. Suitable means are provided for keying the cylinder 90 to the tie bar 127. Suitable pistons broadly designated at 130 and 131 (Figures 8 and 8–A), of any desired construction, are suitably secured to the proximate or inner ends of the respective piston rods 91 and 92 and the cylinder 90 is mounted for longitudinal sliding movement on the pistons 130 and 131.

In this instance, it will be observed in Figure 9 that each of the pistons 130 comprises a pair of oppositely facing resilient cup members or leathers 132 which are held in juxtaposition by a pair of rigid washers 133 and 134, the outer surfaces of which are engaged by the inner end of the corresponding piston rod 91 or 92 and the tie or splicing bar 127. The splicing bar 127 has a reduced threaded portion 135 at each end thereof, only one end of which is shown in Figure 9, and each of these reduced ends 135 of the tie bar 127 slidably penetrates the washers 133 and 134 and the cup 132 and is threadably embedded in the end of the corresponding piston rod 91 or 92.

The reduced portion 135 at each end of the tie bar 127 is tightened in the threaded end of the piston rod 91 or 92 and is locked in position by a suitable locking pin 136. It will be observed that the proximate ends of the piston rods 91 and 92 are each provided with one or more apertures 137 therein for passage of compressed air therethrough as will be later described.

Referring to Figures 8–A, 10 and 11, the cylinder 90 carries a plurality of longitudinally spaced radially extending substantially inverted U-shaped or V-shaped yarn or strand separating fingers 140 which are preferably formed from a wire of relatively small cross-sectional diameter and opposed ends of each of which is suitably secured, as by bolts 141, to an elongated bar 142 which is shown in the form of an angle bar in Figures 6 to 12, inclusive. This angle bar 142 is secured to what is normally the upper surface of the cylinder 90 by any suitable means such as a screw 143 which is disposed at the center of the cylinder 90 in radial alinement with a centrally disposed guide block 144 disposed within the cylinder 90 and which is secured in the cylinder 90 by a suitable lubricant fitting 145.

The guide block 144 is mounted for longitudinal sliding movement on the tie bar or splicing bar 127 and has a relatively small aperture 146 therethrough through which lubricant may be directed from the lubricant fitting 145 and to subsequently be deposited upon the tie bar or splicing bar 127 to thereby insure that the guide block 144 may slide freely on the tie bar or splicing bar 127.

It will be observed in Figure 11 that the guide block 144 has a plurality of circularly spaced notches or passageways 147 in the periphery thereof to permit air to pass therethrough during movement of the cylinder 90 and the guide block 144. It will be also observed in Figure 11 that a suitable tubular spacing member or washer 150 is disposed between the proximate surfaces of the angle bar 142 and the cylinder 90, this washer being slidably penetrated by the screw 143 to thereby insure that the central portion of the angle bar 142 is spaced slightly from the periphery of the cylinder 90 for purposes to be presently described.

Opposed ends of the angle bar 142 are suitably secured to the tubular members 120 at opposed ends of the cylinder 90, as by screws 151 and, since these tubular members 120 encircle the corresponding ends of the cylinder 90, it is thus seen that the opposed ends of the angle bar 142 are spaced from the periphery of the cylinder 90. Thus, the washer 150 is required so the bar 142 extends in a straight line.

During normal operation of the quilling machine, that is, when the belt 45 is disposed in engagement with the main driving or high speed pulley 40 (Figures 1 and 2), the yarn or strand separating fingers 140 extend upwardly and into the path of travel of the sheet of warp yarns W, as shown in Figure 6, to thereby engage the strands and to separate any of the strands of yarn which may have adhered to one another as reciprocatory movement is imparted to the tubular member or cylinder 90 longitudinally of its axis by means to be later described.

It is evident that, upon the treadle bar 64 being permitted to move upwardly slightly from the position shown in Figure 4, the shifter 82 will shift the belt 45 into engagement with the low speed pulley 43 to thereby cause the sheet of warp yarns W to move toward the front of the machine and over the idler roll 55 at a relatively slow rate. This will also permit the sprocket wheel 110 (Figure 1) to move slightly in a clockwise direction and will thereby cause the fingers 140 to move rearwardly and out of engagement with the sheet of warp yarns W.

Of course, when the treadle bar 64 is permitted to move upwardly to the limit of its upward stroke, the fingers 140 will assume substantially the position shown in Figure 7 and will also be clear of the sheet of warp yarns W to permit the operator to piece any broken ends together without being encumbered by the fingers 140.

It is evident that the cylinder 90 is caused to oscillate with the sprocket wheel 110 in the manner heretofore described because of the guide block 144 (Figures 10 and 11) disposed at the center thereof and also due to the fact that the tie bar or splicing bar 127 is secured in fixed relation to the piston rods 91 and 92 and the sprocket wheel 110 being fixedly mounted on the reduced portion 91a of the piston rod 91 (Figure 5).

Now, in order to cause reciprocatory movement of the cylinder 90 longitudinally of the piston rods 91 and 92, the outer or remote ends of the piston rods 91 and 92 have suitable respective pipes or conduits 153 and 154 connected thereto, each of these pipes 153 and 154 being connected to the corresponding tubular piston rods 91 and 92 by means of a pipe elbow 155. Each of the pipes or conduits 153 and 154 is preferably made from a pliable material such as rubber and the like in order to permit the corresponding elbows 155 and the piston rods 91 and 92 to oscillate about their axes.

The pipes 153 and 154 extend upwardly and then curve downwardly and their ends remote from the corresponding pipe elbows 155 are suitably connected to the remote or outer ends of respective pipes 156 and 157. These pipes 156 and 157 extend inwardly and the proximate ends thereof are connected to a valve assembly or four-way valve broadly designated at 160.

Referring to Figures 10 and 11, it will be observed that the four-way valve 160 comprises a housing 160a having an oscillatable core 161 mounted therein which is provided with curved channels or passageways 162 and 163. The housing 160a of the valve 160 has passageways 164 to 167, inclusive, therein and the proximate ends of the pipes 156 and 157 communicate with the respective passageways 164 and 166. The valve housing 160a also has the corresponding end of an exhaust pipe or conduit 170 connected thereto in communication with the passageway 165 and an air or fluid inlet pipe 171 connected thereto and communicating with the passageway 167. The points to which these pipes 170 and 171 extend will be later described.

The valve assembly 160 may be supported in any desired manner so as to be positioned in predetermined spaced relation to the lower surface of the cylinder 90 and it will be observed in Figures 10, 11 and 12 that the valve housing 160a is suitably secured to the upper surface of an angle clip 172 which is suitably secured, as by screws or rivets 173, to a forwardly and rearwardly extending valve support bar 174. This valve support bar 174 extends forwardly, as shown in Figures 1, 2 and 3, and the front end thereof is suitably secured to the transverse frame member or tie rod 15. The bar 174 also extends rearwardly and is suitably secured to the upper end of a standard 175 which extends downwardly and is suitably secured to the upper transverse frame member or tie rod 16.

The front end of the valve core 161 has a reduced portion 161a integral therewith (Figures 11 and 12) on which the lower end of a valve control lever or arm 176 is fixedly mounted. The valve control lever 176 is provided with upwardly diverging lower surfaces 176a and 176b and the upper or free end thereof is bifurcated to form a notch 176c therein. This notch 176c is disposed radially of the axis of the valve control lever or arm 176. Also, disposed radially of the axis of the valve control lever 176 between the notch 176c and the reduced end 161a of the valve core 161 is a spring anchor 177 to which the upper end of a tension spring 180 is connected.

The tension spring 180 extends downwardly and the lower end thereof is connected to a spring anchor 181 which is shown in the form of a rod suitably secured to the lower surface of the horizontal leg of the angle clip 172, by any suitable means such as welding. The valve housing 160a has a projection 182 on the front end thereof which is disposed immediately beneath the valve control lever 176 and the upper surface of which serves as a stop for the valve control lever 176. The valve control lever 176 is moved to and fro at the upper end thereof, between the solid line position and the dotted line position shown in Figure 12, by means to be presently described, and, in order to insure that the passageways 162 and 163 in the cord 161 of the valve 160 are properly alined with the corresponding passageways in the valve housing 160a, the surfaces 176a and 176b alternately engage the upper surface of the projection 182, against which they are urged by the tension spring 180 as the upper end thereof alternately moves beyond opposed sides of dead center of the axis of the valve control lever 176.

Now, in order to limit the stroke of the cylinder 90 and to simultaneously reverse the direction of movement thereof, the cylinder 90 has a pair of longitudinally spaced valve actuating devices broadly designated at 185 and 186 adjustably mounted thereon. Since both of these valve actuating devices 185 and 186 are identical, only one of the valve actuating devices will be described and both of the valve actuating devices will bear the same reference characters.

Each of the valve actuating devices 185 and 186 comprises a resilient bumper or valve actuating member 187 which is preferably made from rubber and is substantially semi-circular with the curved surface thereof facing downwardly and the radius thereof extending substantially from the axis of the cylinder 90. The lower surface of this resilient member 187 is positioned in a slightly lower horizontal plane than the upper edge of the valve control lever 176 for purposes to be presently described.

This resilient member 187 is pivotally mounted, as at 190, on a bracket 191 which encircles the cylinder 90 and has a pair of spaced projections 191a and 191b integral therewith (Figures 11 and 12). The projections 191a and 191b are slidably penetrated by a clamping screw 192 which has a nut 192a threadably mounted thereon and which, upon being tightened, will clamp the bracket 191 in the desired position on the cylinder 190. In order to prevent each resilient valve actuating member 187 from moving outwardly upon engaging the valve control lever 176, a suitable limiting or stop member 193, in the form of an angle clip, is suitably secured to the lower surface of the bracket 191, as by welding, and against which the outer surface of the corresponding resilient member 187 is normally disposed.

The resilient member 187 depends from the pivot point 190 on the bracket 191 by gravity and, upon the outer surface thereof engaging the valve control lever 176, that is, the surface adjacent the stop member 193, the resilient member 187 is permitted to move inwardly and upwardly relative to the center of the cylinder 90 to thus ride over the valve control lever 172. In order to permit the resilient members 187 to pivot upwardly in the manner described, each of the resilient members 187 has a notch 195 in the inner face thereof adjacent the bracket 191, the walls of which straddle the cylinder 90 when the resilient member 187 is pivoted inwardly and upwardly.

In operation, assuming the cylinder 90 to be moving from right to left in Figure 10 or from left to right in Figure 12, the resilient member 187 associated with the valve actuating device 186 moves therewith and the inner surface thereof moves into the notch 176c in the valve control lever 176 and, thus, engages the corresponding wall thereof to cause the valve control lever 176 to move from the solid line to the dotted line position shown in Figure 12. The valve core 161 will consequently be rotated a quarter revolution to thereby position the passageway 162 in the core 161 (Figure 10) in communication with the passageways 166 and 167 in the housing 160a and to position the passageway 163 in communication with the passageways 164 and 165. Compressed air or fluid under pressure will then pass from the pipe 171, to which it is admitted in a manner to be later described, through the passageways 167, 162 and 166, successively, and through the pipes 157 and 154 to the tubular piston rod 92.

The compressed air will then be exhausted through the corresponding apertures 137 into the space between the closure, including the gland nut 125 at the right-hand end of the cylinder 90 (Figure 8-B), and the piston 131 (Figure 8-A). Since the piston 131 remains stationary, compressed air thus admitted to the cylinder 90 will cause the cylinder 90 to move from left to right in Figures 8 to 10, inclusive.

Since this reverses the direction of movement of the cylinder 90, the valve actuating devices 185 and 186 will move from left to right in Figure 10, or from right to left in Figure 12, and as the valve actuating device 186 moves from left to right in Figure 10, the resilient member 187 associated therewith will ride over the upper edge of the valve control lever 176 in the manner heretofore described. Subsequently, the resilient member 187 of the valve actuating device 185 will enter the notch 176c in the valve control lever 176 to again move the valve control lever to the solid line position shown in Figures 10 and 12 and to again cause the cylinder 90 to reverse its direction of movement.

This movement of the valve control lever 176 to the solid line position shown in Figures 10 and 12 causes the passageways 162 and 163 in the valve core 161 to assume the position shown in Figure 10 with the result that the compressed air will pass from the pipe 171 through the passageways 167, 162, and 164, successively, through the pipes 156 and 153 to enter the tubular piston rod 91. The compressed air will then be exhausted through the corresponding apertures 137 thereby entering the left-hand portion of the cylinder 90 between the closure at the left-hand end thereof in Figure 9 and the piston 132 thus causing the cylinder 90 to move from right to left in Figures 8 to 10, inclusive. Of course, the air in cylinder 90 at the right-hand end thereof will be discharged through the apertures 137 in piston rod 92 at this time.

It is thus seen that the only audible sounds in the operation of the device is that of the compressed air being exhausted through the pipe 170 and, if so desired, the exhaust pipe 170 may extend through the floor F to thus exhaust the compressed air at a point remote from the machine with the result that this sound would also be inaudible to the operator. Also, an advantage of the particular manner in which this cylinder 90 is operated is the lack of impact at the ends of its strokes in opposite directions which not only renders the movement of the cylinder inaudible but also permits the improved raking device to be operated at extremely fast speeds without placing the device under excessive stresses. This greatly extends the life of the device and reduces maintenance thereof to a minimum in comparison to raking devices heretofore employed.

Now, in order to control the operation of the cylinder 90, in cooperation with the spindles 20 of the quilling machine, the compressed air inlet pipe 171 extends outwardly and then downwardly in Figure 2 and it will be observed in Figure 3 that the pipe 171 then extends rearwardly in a horizontal plane and has an air pressure gauge 200 mounted thereon in advance of a pressure regulating valve 201 which is mounted to thereby regulate the velocity of the compressed air entering the valve housing 160a and to regulate the speed at which reciprocatory movement is imparted to the cylinder 90. The pipe 171 then extends downwardly and passes through the lower portion of the side frame member 11 and then extends further downwardly as shown in Figure 4 and then rearwardly and is connected to a normally closed control valve 205. This valve 205 has another pipe 206 connected thereto which extends downwardly in Figure 4 and the other end of which is connected to a suitable source of compressed air, not shown.

The valve 205 is of a type having an upwardly biased plunger 207 thereon and when this plunger 207 is in raised position in Figure 4, the valve 205 is closed thus preventing compressed air from entering the pipe 171. The valve 205 is suitably secured to an angle bracket 210 which is suitably secured, as by screws 211, to the inner surface of the side frame member 10 (Figure 4).

The bracket 210 has a valve control lever 212 oscillatably mounted thereon, as at 213, which extends forwardly and the front end of which has an adjustment screw 214 threadably mounted therein. This adjustment screw 214 is locked in the desired adjusted position by a lock nut 215. The lower end of the adjustment screw 214 is engaged by the upper surface of the arm 73 of the bell crank 74 during normal operation of the quilling machine as is clearly shown in Figure 4. However, upon the treadle bar 64 being permitted to move upwardly to a fully inoperative position, this arm 73 of the bell crank 74 is spaced substantially below the lower surface of the adjustment screw 214.

In operation, there may be times when it is desirous that the sheet of warp yarns W is permitted to move forwardly at an intermediate high speed closely approaching the normal high speed of the machine while the raking device comprising the cylinder 90 remains at rest. Therefore, the adjustment screw 214 will have previously been adjusted so that, upon the belt 45 being positioned only partially in engagement with the low speed pulley 43 (Figure 2) and a substantial portion of the belt 45 being in engagement with the high speed pulley 40, the upper surface of the arm 73 of the bell crank 74 will not have effected upward movement of the adjustment screw 214.

This may result in the belt 45 slipping on the pulley 44, but there would be sufficient traction between the belt 45 and the pulley 44 to at least cause the pulley 44 to rotate at said intermediate high speed or at a slightly slower speed than its normal high speed when the belt 45 is fully in engagement with the high speed pulley 44. Operation of the quilling machine in this manner may be desirable in the event of one or more of the yarns Y in the sheet of warp yarns W becoming parted at a point substantially in advance of the quilling machine and, in which case, it would be desirable to operate the machine at a high speed without operating the raking device, since the broken ends would probably hang substantially below the normal plane of the sheet of warp yarns W and would probably become entangled in the raking device if the cylinder 90 was reciprocating.

If a high warp speed were not used in this instance, the weight of the strand of yarn would cause the same to continue to fall downwardly as it left the tail stock 53e. Of course, when the adjacent yarns move fast enough, the broken yarn will cling or adhere to the adjacent yarns until it is moved to within reach of the operator standing on the platform 63.

When the treadle bar 64 is moved all the way downwardly to fully operative position, as shown in Figures 1, 3 and 4, the raking fingers 140 would then be disposed in their fully operative or vertical position and both the quilling machine and the raking apparatus will operate at normal high speed, since the belt 45 will then be in full engagement with the high speed pulley 40 in Figure 2 and the lower substantially as shown in Figure 2 and the lower end of the adjustment screw 214 in Figure 4 will be engaged by the arm 73 of the bell crank 74 and will have caused the rear end of the valve control lever 212 (Figure 4) to move the plunger 207 downwardly thereby opening the valve 205.

Compressed air then enters the pipe 171 and passes therefrom to the valve assembly 160 at the pressure previously determined by regulating the pressure regulator valve 201. Thus, reciprocatory movement will be imparted to the cylinder 90 at its normal operating speed as the sheet of warp yarns W passes through the reed 56 at its normal high speed.

Now, as heretofore stated, it is occasionally necessary for the operator to retard or slow down the movement of the sheet of warp yarns W momentarily, when it is essential that the raking fingers 140 remain in an operative position for properly raking and separating adherent and intertwined yarns. In this instance, the operator would grasp the rope R to retard movement thereof. There are various reasons why it is necessary to suddenly and momentarily slow down the movement of the sheet of warp yarns W without moving the belt 45 from full engagement with the high speed pulley 40.

Now, if the raking device was powered or motivated by the tailstock 53e it is evident that the sudden slowing down of the movement of the sheet of warp yarns W would cause the raking device to operate at a slower rate thereby decreasing the effectiveness of the raking means when it was most needed. For purposes of description and to clearly define the speed of the warp yarns in the claims, the variation in the speed of the warp yarns caused by the operator grasping the rope of yarns and retarding movement thereof shall be termed as a sub-normal low speed since the yarns are occasionally permitted to move in the latter instance at a speed slower than the speed at which the yarns would travel if the belt 45 was in engagement with the low speed pulley 43. However, it is to be understood that the sheet of warp yarns W may be permitted to move at any speed less than the normal high speed of the machine when the rope of yarns R, from which the sheet of warp yarns W is formed, is retarded by means of the operator grasping the rope of yarns and permitting the same to slip through his hand or hands.

Of course, as heretofore stated, it is to be understood the the present quilling machine is of the type which has the quills thereon frictionally mounted on the spindles 20 so the quills 21 will rotate at a slower speed than the speed of rotation of the spindles 20 when the sheet of warp yarns W is retarded by means of the operator grasping said rope of yarns R (Figure 15).

It might be stated that it is necessary for the operator to slow down the movement of the sheet of warp yarns in the manner last described while the quilling machine operates at a normal high speed in the event of a substantial number of the yarns being intertwined with respect to each other or if it should happen that the yarns had become immersed in some type of solution which would cause the yarns to adhere to each other to such an extent that the movement of the yarns through the reed at a high rate of speed would cause the yarns to break.

It is essential that the raking device continues to operate at its normal speed during the time that the operator is grasping the rope of yarns R, since it would be inconvenient for the operator to separate these intertwined or adherent yarns manually at the same time that the operator is grasping the rope of yarns R. Also, rapid reciprocation of the raking fingers 140 would be necessary at this time to insure that the raking fingers 140 move past the yarns at such a rate of speed that the corresponding adherent or intertwined portions of the yarns will not move beyond the raking fingers 140 at a speed faster than the speed at which the raking fingers reciprocate to separate the yarns. Otherwise, it may happen that the yarns would still be adhering to one another or be intertwined to such an extent that they would be broken upon the adherent yarns engaging the spacing pins 60 of the reed 56.

Also, it is often necessary for the operator to slow down the movement of the sheet of warp yarns, by means of grasping the rope of yarns R, in the event that some of the individual yarns in the sheet of warp yarns W become abnormally slack relative to the remaining or majority of the yarns in the sheet of warp yarns W. In this instance, it is not unusual for the operator to repeatedly "snap" the sheet of warp yarns W by repeatedly and quickly grasping and then releasing the rope of yarns R.

Now, in order to obtain maximum production in a day's time, it is not unusual for an operator to grasp the rope of yarns R at varying pressures to retard movement thereof accordingly. In fact, the operator nearly always grasps the rope of yarns R. However, on certain occasions, he tightens the hold or increases his grasp of the rope. In removing a lease string, he must bring the yarn to a complete standstill. Now, when a machine is running at perhaps 200 yards per minute, and must be stopped within one or two yards, it is necessary for the operator not only to tighten his hold on the rope but also to stop the machine from running; that is, he takes his foot off the treadle bar 64 and allows it to move upward and the belt to go onto the idler pulley 40. As this occurs, he increases his hold on the rope of yarns R and stops it as quickly as possible, or as quickly as can be done safely without breaking the yarn. When the machine is brought to a stop, he reaches up above his head with both hands and removes the lease yarn and then starts the machine up again.

It might be stated that the leases are put in at predetermined intervals, or rather at clocked intervals of 500 yards regardless of whether one end of thread happens to be tied to another at that time or not. An average warp is 6000 yards long and, accordingly, would contain eleven 500 yard leases. The majority of leases are used at 500 yard intervals throughout the warp for the purpose of straightening up any ends that may have been broken during processing and placing them in their proper location in the reed. They are also used at the beginning and the end of each warp, and these leases are used to facilitate the tying of one warp to another.

It will be observed in Figures 1 and 2 that the exhaust pipe 156 extends outwardly from the valve housing 160 and then extends forwardly past the bearing stand or standard 93 and then extends downwardly and terminates in a plane substantially intermediate the upper and lower ends of the side frame member 10. However, as heretofore stated, the exhaust pipe 155 may be extended through the floor F to thus render the sound of the escaping compressed air inaudible to the operator.

It is extremely important that the quilling machine and, of course, the raking mechanism operate with the least possible amount of noise, since the operation of the quilling machine requires a highly skilled operator performing a task in which fatigue often becomes an important factor in a day's production. Also, if it becomes necessary to remove the raking mechanism from the quilling machine or to replace the same, this operation may be easily performed merely by removing the pipes 153 and 154 from the remote ends of the piston rods 91 and 92 and then loosening the nuts 100 and 101 or either one of the nuts 100 and 101 after which the piston rods 91 and 92 and the cylinder 90 may be lifted out of the standards 93 and 94. The cylinder 90 and the piston rods 91 and 92 may be readily reinstalled by reversing the above procedure.

The attitude of the raking fingers 140 may be varied relative to the various positions in which the treadle bar 64 may be disposed by shifting the position of the sprocket chain 111 relative to the sprocket wheel 110 as desired.

Another important feature of the present raking device is the unique configuration of the raking fingers 140. As is well known to those familiar with the art, many experienced quilling machine operators rest their forearms or hands upon the reed 56 during operation of the machine and can often determine when the yarns are not passing through the reed 56 properly or are not being separated properly, due to slight vibrations imparted to the reed 56 or even due to the differences in the sound of the yarns passing through the reed.

Now, as the operator rests his forearms upon the reed 56, his wrists may be relatively limp and his fingers will, on occasion, inadvertently move into the path of the reciprocating raking fingers 140 and will thus be struck thereby. However, the rounded, substantially inverted V-shape of the upper or free ends of the raking fingers 140 is such that the fingers 140 cannot injure the hands of the operator but would merely warn the operator to raise his hands sufficiently so his hands would not be struck repeatedly by the reciprocating raking fingers 140.

Another feature of the present raking device is the fact that it is compactly designed in such a manner that it may be disposed beneath the sheet of warp yarns W rather than above the same since, as heretofore stated, the operator must scan the sheet of warp yarns W in advance of the sheet of warp yarns W passing through the reed 56 and, if a raking device or other reciprocating devices were positioned above the sheet of warp yarns W, this device would be positioned in the line of sight of the operator and would not only distract the view of the operator to some extent but would also cause fatigue of the operator with the result that the operator would not operate the quilling machine with normal efficiency.

In the drawings and specifications there has been set forth a preferred embodiment of the invention, and although specific terms are employed, they are used in generic and descriptive sense only, and not for purpose of limitation, the scope of the invention being defined in the claims.

I claim:

1. In a quilling machine of the character described, the combination with means for taking up a sheet of warp yarns and wherein the sheet of warp yarns is formed from a rope of yarns adapted to be grasped by an operator for retarding movement of the sheet thereby varying the speed at which said warp yarns are taken up, of a raking device positioned adjacent the sheet of warp yarns and having a plurality of longitudinally spaced radially extending raking fingers thereon, means for driving the raking device in a reciprocatory manner transversely of the sheet of warp yarns at a given speed and for maintaining said given speed of the raking means while varying the speed at which the sheet of warp yarns is taken up, the outer ends of the raking fingers extending into the path traveled by the yarns a short distance so that as the raking fingers are reciprocated, the outer ends thereof will ride over a plurality of yarns to strum the same.

2. In a quilling machine having means for taking up a sheet of warp yarns and also having means for starting and stopping the machine and also having a raking means having raking fingers disposed adjacent the sheet of warp yarns and extending transversely to the general direction of said sheet of warp yarns and also having means operable automatically for imparting movement to the raking means transversely to the general direction of said sheet of warp yarns upon starting the machine; means operatively connected to the means for starting and stopping the machine for varying the position of the raking means about its axis for moving the raking fingers into engagement with the sheet of warp yarns upon starting said quilling machine and for moving the raking fingers out of engagement with the sheet of warp yarns upon stopping the machine, the outer ends of the raking fingers extending into the path traveled by the yarns a short distance so that as the raking fingers are reciprocated, the outer ends thereof will ride over a plurality of yarns to strum the same.

3. In a quilling machine of the character described, the combination with means for taking up a sheet of warp yarns and wherein the sheet of warp yarns is formed from a rope of yarns adapted to be grasped by an operator for retarding movement of the sheet thereby varying the speed at which said warp yarns are taken up, of a raking device positioned adjacent the sheet of warp yarns and having a plurality of longitudinally spaced radially extending raking fingers thereon, means for imparting movement to the raking device transversely to the general direction of the sheet of warp yarns at a given speed and for maintaining said given speed of the raking means while varying the speed at which the sheet of warp yarns is taken up, the outer ends of the raking fingers extending into the path traveled by the yarns a short distance so that as the raking fingers are reciprocated, the outer ends thereof will ride over a plurality of yarns to strum the same.

4. An improvement in a raking device for quilling machines, said quilling machine having means for taking up a sheet of warp yarns with the warp yarns extending in a substantially horizontal plane and also having manually operable means for starting and stopping the quilling machine, said raking device having an elongated member provided with a plurality of radially extending longitudinally spaced raking fingers thereon normally projecting into the path of travel of the sheet of warp yarns during operation of the quilling machine and also having means for effecting reciprocatory movement of said elongated member transversely to the general direction of said sheet of warp yarns for separating adherent yarns; said improvement comprising means operable automatically upon said means for starting and stopping the quilling machine being moved to inoperative position for rotating said elongated member to position the radially extending fingers thereon out of engagement with the sheet of warp yarns and means operable automatically upon said means for starting and stopping the machine being moved to operative position for rotating said elongated member to position the radially extending fingers thereon in the path of travel of the sheet of warp yarns.

5. In a quilling machine having means for taking up a sheet of warp yarns and also having means for varying the speed at which the sheet of warp yarns is taken up and also having a raking means disposed adjacent the sheet of warp yarns and extending transversely to the general direction of said warp yarns, said machine also having means for imparting movement to the raking means transversely to the general direction of said warp yarns; said raking means comprising an elongated member, a plurality of longitudinally spaced radially extending substantially V-shaped raking fingers carried by said member and having their legs facing toward the member, and means operatively connected to the means for varying the speed at which the sheet of warp yarns is taken up for varying the position of the radially extending fingers about the axis of the raking means for moving the raking fingers into engagement with the sheet of warp yarns upon starting said quilling machine and for moving the raking fingers out of engagement with the sheet of warp yarns upon stopping said machine.

6. In a quilling machine having means for taking up a sheet of warp yarns and also having means for varying the speed at which the sheet of warp yarns is taken up and also having a raking means disposed adjacent the sheet of warp yarns and extending transversely to and in the general direction of said sheet of warp yarns; means controlled by the means for varying the speed at which the sheet of warp yarns is taken up for imparting movement to the raking means transversely to the general direction of said sheet of warp yarns and at a uniform speed independent of the speed at which the warp yarns are taken up, means for varying the position of the raking means about its axis, and means controlled by the means for varying the speed at which the warp yarns are taken up for controlling the position of the raking means, whereby said raking means may assume a position in engagement with the warp yarns upon said sheet of warp yarns being taken up at a relatively high rate of speed and whereby said raking means is moved out of engagement with the sheet of warp yarns upon the sheet of warp yarns being taken up at a relatively slow rate of speed and upon stopping the machine.

7. In a quilling machine having means for taking up a sheet of warp yarns and also having means for varying the speed at which the sheet of warp yarns is taken up including an operating lever so arranged as to assume an inoperative position when the machine is stopped and to gradually increase the speed at which the sheet of warp yarns is taken up, said quilling machine also having a raking means disposed adjacent the sheet of warp yarns and extending transversely to the general direction of said sheet of warp yarns and also having means for imparting movement to the raking means transversely to the general direction of said sheet of warp yarns; means for varying the position of the raking means about its axis and a mechanical connection between the operating lever and the means for varying the position of the raking means, whereby said raking means may assume a fully operative position in engagement with the sheet of warp yarns upon said operating lever assuming a fully operative position and, upon gradually moving the operating lever toward inoperative position, the raking means will gradually move out of engagement with the sheet of warp yarns, and said raking means being so arranged relative to the operating lever and the mechanical connection to cause the raking means to move entirely out of engagement with the sheet of warp yarns in advance of the operating lever being moved to fully inoperative position.

8. In a quilling machine having means for taking up a sheet of warp yarns and also having means for starting and stopping the machine and said means for starting and stopping the machine including means for varying the speed at which the sheet of warp yarns is taken up to cause the sheet of warp yarns to be taken up at at least three different rates of speed at different intervals including a first rate, a second rate and a third rate, said quilling machine also having a raking means disposed adjacent the sheet of warp yarns and extending transversely to the general direction of said sheet of warp yarns and also having means for imparting movement to the raking means transversely to the general direction of travel of said sheet of warp yarns; means for varying the position of the raking means about its axis for moving the raking means into engagement with the sheet of warp yarns upon starting said quilling machine and with said machine taking up the yarns at said first rate, said means for varying the position of the raking means being so arranged as to cause the raking means to move out of engagement with the warp yarns upon the quilling machine being operated at said second rate and at said third rate and upon stopping said quilling machine.

9. The combination with a quilling machine having means for taking up a sheet of warp yarns and having an operating lever thereon for controlling the movement of the sheet of warp yarns of an improved raking device comprising an elongated cylinder extending transversely to the general direction of said sheet of warp yarns and having a plurality of longitudinally spaced radially extending fingers thereon projecting into the path of travel of the sheet of warp yarns, means closing opposed ends of said cylinder, a piston rod slidably penetrating each of said closed ends of the cylinder and extending outwardly therefrom, means securing the remote ends of said piston rods to the machine, the proximate ends of said piston rods being spaced from each other, a piston secured to the inner end of each of said piston rods and engaging the inner surfaces of the wall of said cylinder, the inner portions of said piston rods disposed within the cylinder having apertures therein positioned within the corresponding portions of the cylinder, each of said piston rods having a longitudinally extending passageway therein communicating with the corresponding apertures, and means operable automatically upon said operating lever being moved to operative position for moving the sheet of warp yarns for alternately introducing compressed air to the passageways in said piston rods to thereby cause the cylinder to reciprocate on said piston rods and said pistons.

10. In a structure according to claim 9, a tie bar mounted in said cylinder and having opposed ends secured to said pistons and means for maintaining said piston rods under tension longitudinally thereof to cause said piston rods, pistons, tie rod and cylinder to be maintained in axial alinement.

11. The combination with a quilling machine having means for taking up a sheet of warp yarns and having an operating lever thereon for controlling the movement of the sheet of warp yarns of an improved raking device comprising an elongated cylinder extending transversely to the general direction of said sheet of warp yarns and having a plurality of longitudinally spaced radially extending fingers thereon normally projecting into the path of travel of the sheet of warp yarns, closure means on opposed ends of said cylinder, a piston rod slidably penetrating each of said closure means on the cylinder and extending outwardly therefrom, means securing the remote ends of said piston rods to the machine, the proximate ends of said piston rods being spaced from each other, pistons secured to the proximate ends of said piston rods and engaging the inner surface of the wall of said cylinder, the proximate portions of said piston rods disposed within the cylinder having apertures therein positioned within the corresponding portions of the cylinder, each of said piston rods having a passageway therein, means operable automatically upon said operating lever being moved to operative position for moving the sheet of warp yarns for alternately introducing compressed air to the passageways in said piston rods to thereby cause the cylinder to reciprocate on said piston rods and said pistons, means operable automatically upon moving said operating lever to operative position for moving the radially extending fingers about the axis of said cylinder for positioning the same in the path of travel of the sheet of warp yarns, and means operable automatically upon moving the operating lever to inoperative position for moving the radially extending fingers in the opposite direction about the axis of the cylinder a predetermined distance to move the same out of the path of travel of the sheet of warp yarns and for stopping the flow of compressed air to the piston rods.

12. The combination with a quilling machine having means for taking up a sheet of warp yarns and having an operating lever thereon for controlling the movement of the sheet of warp yarns of an improved raking device comprising an elongated tubular member extending transversely to the general direction of said sheet of warp yarns and having a plurality of longitudinally spaced radially extending fingers thereon normally projecting into the path of travel of the sheet of warp yarns, closure means closing opposed ends of said tubular member, a piston rod slidably penetrating each of said closure means on the tubular member and extending outwardly therefrom, means securing the remote ends of said piston rods to the machine, the proximate ends of said piston rods being spaced from each other, a piston secured to the inner end of each of said piston rods and engaging the inner surfaces of the walls of said tubular member, the proximate portions of said piston rods disposed within the tubular member having apertures therein positioned within the corresponding portions of the tubular member, each of said piston rods having a passageway therein, means operable automatically upon said operating lever being moved to operative position for moving the sheet of warp yarns for alternately introducing compressed air to the passageways in said piston rods to thereby cause the tubular member to reciprocate on said piston rods and said pistons, means operable automatically upon moving said operating lever to operative position for moving the radially extending fingers about the axis of said tubular member for positioning the same in the path of travel of the sheet of warp yarns, and means operable automatically upon moving the operating lever to inoperative position for moving the radially extending fingers in the opposite direction about the axis of the tubular member a predetermined distance to move the same out of the path of travel of the sheet of warp yarns and for stopping the flow of compressed air to the piston rods.

13. The combination with a quilling machine having means for taking up a sheet of warp yarns and having an operating lever thereon from controlling the movement of the sheet of warp yarns of an improved raking device comprising an elongated cylinder extending transversely to the general direction of said sheet of warp yarns and having a plurality of longitudinally spaced radially extending fingers thereon normally projecting into the path of travel of the sheet of warp yarns, closure means on opposed ends of said cylinder; a piston rod slidably penetrating each of said closure means on the cylinder and extending outwardly therefrom, means securing the remote ends of said piston rods to the machine, the proximate ends of said piston rods being spaced from each other, pistons secured to the proximate ends of said piston rods and engaging the inner surface of the wall of said piston cylinder, the proximate portions of said piston rods disposed within the cylinder having apertures therein positioned within the corresponding portions of the cylinder, each of said piston rods having a passageway therein, means operable automatically upon said operating lever being moved to operative position for moving the sheet of warp yarns for alternately introducing compressed air to the passageways in said piston rods to thereby cause the cylinder to reciprocate on said piston rods and said pistons, said means for securing the piston rods to the machine including means for rotatably supporting said piston rods, means keying said cylinder to the piston rods, a sprocket wheel fixed on one of the piston rods, a sprocket chain at least partially encircling said sprocket wheel, spring means normally urging said sprocket chain in one direction, means connecting the end of said sprocket chain remote from the spring means to said operating lever, and said radially extending fingers on the cylinder being disposed in a position out of the path of travel of the sheet of warp yarns while the quilling machine is stopped and while the operating lever is in an inoperative position whereby, upon moving the operating lever to operative position, said sprocket chain causes the sprocket wheel to rotate a partial revolution to, in turn, impart a partial revolution to the piston rods and the cylinder to thereby position the radially extending fingers on the cylinder in the path of travel of the sheet of warp yarns.

14. In a quilling machine having means for taking up a sheet of warp yarns wherein the sheet extends in a substantially horizontal plane and also having manually operable control means for starting and stopping the machine and for varying the speed at which the sheet of warp yarns is taken up and said quilling machine having laterally spaced side frame members, an improved raking device comprising a pair of horizontally disposed laterally extending tubular piston rods disposed in axial alinement relative to each other, a piston on the inner end of each of the piston rods, a tie bar connected at opposed ends thereof to said pistons, an elongated tubular member mounted for sliding movement on said pistons and on said piston rods, a plurality of radially extending longitudinally spaced fingers carried by said tubular member, a bifurcated standard carried by each of said side frame members and being loosely penetrated by the corresponding piston rod, a thrust bearing encircling each of said piston rods and engaging the outer surface of said corresponding standard with respect to said tubular member, threaded means on the outer end of each of said piston rods engaging the outer surface of the corresponding thrust bearing for maintaining the piston rods and the tie bar in a taut state, each of said piston rods having at least one aperture therein disposed at a point between the corresponding end of the tubular member and the corresponding piston, means for alternately directing compressed air into each of said tubular piston rods while exhausting compressed air from the other of the piston rods at a uniform pressure while varying the speed at which the sheet of warp yarns is taken up, means controlled by the means for varying the speed at which the sheet of warp yarns is taken up for partially rotating the piston rods and means for keying the tubular member to the tie bar whereby, upon operation of said means for taking up the sheet of warp yarns, the radially extending fingers thereon are disposed in the path of travel of the sheet of warp yarns and, upon stopping the machine, the radially extending fingers will assume a position out of the path of travel of the sheet of warp yarns.

15. In a quilling machine having means for taking up a sheet of warp yarns wherein the sheet extends in a substantially horizontal plane and also having manually operable control means for starting and stopping the machine and for varying the speed at which the warp yarns are taken up and said quilling machine having laterally spaced side frame members, an improved raking device comprising a cylinder disposed immediately beneath the path of travel of the sheet of warp yarns and having a plurality of radially extending longitudinally spaced raking fingers thereon extending into the path of travel of the sheet of warp yarns, opposed ends of said cylinder having closure means thereon, a piston rod penetrating each of said closure means and extending outwardly therefrom, means on the side frame members for supporting the remote ends of said piston rods with respect to each other, a piston fixed to the inner end of each of the piston rods and on which the cylinder has sliding movement, the inner ends of the piston rods having at least one aperture therein, each of said piston rods also having a passageway extending longitudinally thereof and communicating with said aperture, a source of fluid under pressure, a first valve disposed adjacent the cylinder and having a valve control lever thereon for controlling the operation of said first valve, a second valve, a conduit connecting the first valve with the second valve, means connecting said source of fluid under pressure to the second valve, means controlled by said means for varying the speed of the means for taking up the sheet of warp yarns for opening said second valve during operation of the quilling machine for permitting fluid under pressure to flow from the source through the second valve and through the first valve, pipe connections from each of the piston rods to said first valve, said pipe connections communicating with the passageways in the respective piston rods, a pair of longitudinally spaced radially extending valve actuating members secured to the cylinder and being disposed in the path of the valve control lever and said first valve having passageways therein so arranged as to direct fluid under pressure therethrough to the pipe connections extending therefrom and to the passageways in the piston rods alternately depending upon the position of the valve control lever, whereby, as movement is imparted to the sheet of warp yarns, fluid under pressure is introduced to one end of the cylinder between the corresponding piston and the closure means on one end of the cylinder to cause the cylinder to move toward the outer end of the corresponding piston rod through which the fluid under pressure is directed to the cylinder and, whereby one of the valve actuating members will engage the valve control lever to thereby cause the fluid under pressure to be directed into the other of the pipe connections to introduce fluid under pressure to the opposite end of the cylinder and to cause the cylinder to reverse to thereby cause reciprocatory movement to be imparted to the cylinder.

16. The combination with a quilling machine having means for taking up a sheet of warp yarns and having a manually controlled operating member thereon for controlling movement of the sheet of warp yarns, of a raking device comprising an elongated tubular member extending transversely to the general direction of said sheet of warp yarns, a plurality of longitudinally spaced substantially radially extending raking fingers carried by said tubular member and projecting into the path of the sheet of warp yarns, closure means on opposite ends of the tubular member, a piston rod slidably penetrating each of said closure means, means connecting the outer ends of the piston rods to the machine, piston means fixed to the inner ends of said piston rods, said piston rods each having a longitudinally extending passageway therein and also having at least one aperture therein positioned adjacent the piston means and communicating with the passageway, means operable automatically upon said operating member being moved to operative position for alternately introducing compressed air into the passageway and through the aperture in the first of said piston rods for introducing compressed air into one end of said tubular member while permitting air from the other end of the tubular member to escape through the aperture and passageway in the second of the piston rods for moving the tubular member in one direction, and means operable automatically, upon said tubular member moving a predetermined distance in one direction for introducing compressed air into the second of the piston rods while permitting air to escape through the first of the piston rods for moving the tubular member in the opposite direction, whereby the cylinder reciprocates on the piston means and the piston rods.

17. In a quilling machine having means for taking up a sheet of warp yarns and also having means for varying the speed at which the sheet of warp yarns is taken up and also having a raking means disposed adjacent the sheet of warp yarns and extending transversely to the general direction of said warp yarns, said machine also having means for imparting movement to the raking means transversely to the general direction of said warp yarns; said raking means comprising an elongated member, a plurality of longitudinally spaced radially extending substantially V-shaped raking fingers carried by said member and having their legs facing toward the member, means operatively connected to the means for varying the speed at which the sheet of warp yarns is taken up for varying the position of the radially extending fingers about the axis of the raking means for moving the raking fingers into engagement with the sheet of warp yarns upon starting said quilling machine and for moving the raking fingers out of engagement with the sheet of warp yarns upon stopping the machine, and means for circularly adjusting the position of the elongated member relative to the means operatively connected to the means for varying the speed at which the sheet of warp yarns is taken up to thereby determine the amount the raking fingers penetrate the sheet of warp yarns when in engagement therewith.

RICHARD R. CONE.

References Cited in the file of this patent

UNITED STATES PATENTS

| Number | Name | Date |
|---|---|---|
| 365,949 | Stone | July 5, 1887 |
| 641,327 | Robinson et al. | Jan. 16, 1900 |
| 2,092,811 | Moncrieff et al. | Sept. 14, 1937 |
| 2,111,946 | Selley | Mar. 22, 1938 |
| 2,207,607 | Blom | July 9, 1940 |
| 2,249,988 | Thomas | July 22, 1941 |
| 2,345,544 | Worthington | Mar. 28, 1944 |
| 2,363,205 | Smith | Nov. 21, 1944 |
| 2,382,465 | Carlson | Aug. 14, 1945 |

FOREIGN PATENTS

| Number | Country | Date |
|---|---|---|
| 676,141 | France | Nov. 18, 1929 |